United States Patent [19]

DeBolt et al.

[11] 4,252,378
[45] Feb. 24, 1981

[54] WHEEL LAMINATE WITH SYNTACTIC FOAM CORE

[75] Inventors: Reuben A. DeBolt, Akron; Ralph A. Maglio, Wadsworth; Richard W. Sicka, Brecksville, all of Ohio

[73] Assignee: The Firestone Tire & Rubber Company, Akron, Ohio

[21] Appl. No.: 81,755

[22] Filed: Oct. 4, 1979

[51] Int. Cl.³ .......................... B60B 3/08; B60B 5/02
[52] U.S. Cl. ........................... 301/63 DD; 301/63 PW
[58] Field of Search .......... 301/63 R, 63 DD, 63 DT, 301/63 C, 63 PW, 65; 29/159.1, 159.01, 159.03

[56] References Cited

U.S. PATENT DOCUMENTS

| | | | |
|---|---|---|---|
| 3,622,437 | 11/1971 | Hobalca | 161/168 |
| 3,669,501 | 6/1972 | Derleth | 301/37 R |
| 3,790,219 | 2/1974 | Watts | 301/63 DD |
| 3,968,996 | 7/1976 | Wilcox | 301/37 R |
| 4,000,926 | 1/1977 | Wilcox | 301/63 DD |
| 4,035,028 | 7/1977 | Wilcox | 301/13 SM |
| 4,082,702 | 4/1978 | Harper | 260/2.5 AK |
| 4,107,134 | 8/1978 | Dawans | 260/42.17 |
| 4,114,953 | 9/1978 | Baumgartner | 301/63 PW X |
| 4,153,657 | 5/1979 | Wilcox | 264/46.6 |

Primary Examiner—Charles A. Marmor

[57] ABSTRACT

High modulus and high performance composite vehicle wheels are prepared as laminate or sandwich structures having a fiber-reinforced syntactic foam core with disc member reinforcing means contained therein. This wheel is lightweight and for pneumatic tires wherein the syntactic foam is bonded to impact resistant rim and disc-nave sheets such as those made of thin steel. The reinforcing disc member transfers stresses from the vehicle wheel hub to the syntactic foam when, for example, cornering a vehicle.

12 Claims, 2 Drawing Figures

WHEEL LAMINATE WITH SYNTACTIC FOAM CORE

BACKGROUND OF THE INVENTION

1. Field of the Invention

This invention is directed to the manufacture of unique high modulus composite wheel structures having a fiber reinforced syntactic foam core and disc member; these structures can be fabricated, for example, to produce automotive wheels for pneumatic tires which are lightweight and have compressive strength and modulus.

2. Description of the Prior Art

The design concepts and production techniques used in the manufacture of vehicle wheels for the automotive industry have not been significantly changed for many years. The only notable exception was the introduction of styled wheels in the 1960's. Styled wheels do not require hubcaps or other wheel covers, and their popularity has grown continuously since their introduction. Nonetheless, the conventional steel disc wheel still predominates in the automotive industry.

Vehicle wheels have been fabricated from synthetic plastic materials as illustrated in U.S. Pat. No. 3,790,220. As noted in this patent, these wheels have not been competitive with steel wheels. Rather plastic wheels have been especially, though not exclusively, intended for use with vehicles such as transport carts, fork lifts, and the like, having small diameter wheels.

Plastic materials are also known for use as elements in otherwise metal wheels. For example, U.S. Pat. No. 3,790,219 discloses the use of expanded polyurethane or polystyrene foam, or other honeycomb plastic material, for use as a spacer, or packing element, in wrought metal wheels; this foam lacks compressive strength and has low heat resistance. The wheels which are the subject of U.S. Pat. No. 3,790,219 are wheels manufactured from lightweight alloys such as alloys of magnesium for high performance cars.

Polyurethane foam is also known for use as an adhesive to bond ornamental plastic wheel covers to conventional steel disc wheels. U.S. Pat. No. 3,669,501 shows such an application of polyurethane foam. As pointed out in that patent, the wheel is of conventional construction, i.e., the wheel is the conventional steel disc wheel which predominates the vehicle wheel market. The polyurethane is strictly an adhesive material to secure the cover permanently to the wheel.

The vehicle wheel of U.S. Pat. No. 3,968,996 uses an organic resin foam, such as polyurethane foam, as a structural load bearing member. An inner wheel disc, an outer decorative disc, and a rim interlocked with both those discs are interconnected and bonded by polyurethane foam. The polyurethane foam serves as a load bearing and load transmitting structural member. According to one method for manufacturing the instant wheel, the wheel rim, inner wheel disc, and outer decorative disc are positioned in a die, and a polyurethane composition is then injected into the volume defined by those wheel components for curing in situ. Alternatively, a polyurethane foam preform is adhesively bonded to the rim, inner wheel disc, and outer decorative disc in an assembly die. This vehicle wheel provides style flexibility and styling attractiveness. Furthermore, the instant wheel affords improved dimensional control, improved concentricity, and improved wheel balance in a vehicle wheel further characterized by low cost and lightweight. Finally, since the resultant wheel is a solid wheel, noise control is insured.

According to U.S. Pat. No. 4,000,926, a vehicle wheel can include a structural member defining the outboard side of a wheel disc and having radial openings spaced circumferentially from each other. Ribs that are preformed are inserted through the openings projecting in an outboard direction to give the wheel a styled appearance. The ribs cooperate with the outboard structural member defining the openings and other structural members of the wheel to define an enclosed cavity that receives organic resin foam. The foam is adhered to the structural members and to the ribs to cooperate therewith as a load bearing component of the wheel.

The ribs are preferably formed by a stamping operation. The stamping tools for the ribs only have to form a single rib during each stroke. The tooling expense necessary to form the ribs is thus minimized since the tools do not have to incorporate portions for simultaneously forming each rib of the wheel. Also, this rib stamping process may proceed at a much more rapid rate than when the ribs are formed integrally with a structural member that defines the rest of the outboard extremity of the wheel. In fact, the individual rib stamping may proceed so rapidly that the number of ribs necessary, usually five, may be stamped by the required number of strokes in a shorter time than is necessary to stamp a single wheel structural member having the integral ribs. This latter stamping must be formed at a slower rate due to its larger size.

The stamped ribs preferably include flanges that engage the interior side of the outboard structural member defining the radial openings through which the ribs project. These flanges may be adhesively secured to the outboard structural member prior to receiving the foam which is preferably injected into the cavity for curing.

Conventional automotive wheels include an annular rim that supports an associated tire. A disc of the wheel is secured to the rim within its annular configuration. The central portion of the wheel disc includes holes for receiving bolts which detachably secure the wheel to an associated hub. The wheel rim and disc are conventionally made by forging of the steel stock that is of a relatively heavy gauge, i.e., on the order of one-eighth inch thickness. The outer periphery of the disc is fixedly secured to the rim by welding so that the rim and disc are inseparable. The point of separation between the components of the automotive wheel assembly thus occurs at the wheel disc and hub during replacement or repair of the associated vehicle tire. This necessarily means that each automotive vehicle having four wheel assemblies being utilized and one spare tire requires five wheels having a rim and disc. The forging process of the relatively heavy steel stock from which the wheel components are made must be carried out with sufficient accuracy so that no unbalanced forces are present during the rotation of the wheel. The heavy stock from which the wheel is forged makes this balancing somewhat more difficult than would be the case if lighter stock were utilized. However, to provide the required structural strength, such heavy stock is necessary with conventional automotive wheels.

Vehicle wheel assemblies of the more heavy duty type for use on trucks or trailers have a somewhat different construction than automotive wheel assemblies. These heavy duty wheel assembly constructions conventionally include a wheel hub that is cast or forged from steel. The disc portion of the wheel may be integral with the hub and support the brake drum or brake disc of the wheel assembly. The outer periphery of the integral hub and wheel disc detachably supports one or more wheel rims for carrying one or more tires. The heavy duty wheel assembly construction may also take another form wherein the rim and disc portions of the wheel are welded to each other and detachably secured to the wheel hub. In this construction, the brake drum or brake disc is fixedly secured to the hub. Both of these heavy duty wheel assembly constructions require a relative large amount of machining to provide the balanced wheel assembly necessary.

U.S. Pat. No. 3,874,055 discloses a method of making a vehicle wheel that is particularly designed for use as a heavy duty truck or trailer type wheel. The disc portion of this wheel is manufactured from a continuous metallic strip that is stamped to define retaining flanges. The stamped strip is then coiled into a single closed loop that is stamped radially to define spoke-like components. The central portion defined by these spoke-like components is secured to a cast for forged hub. The periphery of this stamped structure is detachably secured to a pair of rims to complete the assembly. The hub and rims of this wheel assembly are both forged or cast and may require machining to provide the necessary balance.

U.S. Pat. No. 4,035,028 is directed to vehicle wheel assemblies and components thereof that are manufactured with a foam construction so as to have light weight, good balance without any machining, and a low manufacturing cost. The foam construction includes structural members of a relatively lightweight material that are secured to each other to define an enclosed cavity that receives an organic resin foam, such as polyurethane foam. The foam may be injected into the cavity so as to adhere to the structural members during its curing. Alternately, the foam may be preformed and received between the structural members as these members are secured to each other. In the latter case, an adhesive adheres the foam to the structural members defining the cavity.

According to U.S. Pat. No. 4,107,134, the generic term "syntactic foam" is known to be directed to a variety of polymeric materials that have been lightened by inclusion of hollow spheres.

The hollow spheres which are included in the syntactic foams of this patent may be either inorganic or organic. By way of example, there can be mentioned the microballons of borosilicate glass, silica, carbon, or thermoplastic or thermoset resins, whose diameter is generally from 10 to 500 micrometers, and the "microballoons" of glass, or thermoplastic or thermoset resins, whose diameter is in most cases from 1 to 100 micrometers.

The amount, the type and the size of the hollow spheres are determined in accordance with the properties desired for the syntactic foam. Generally, there is used from 5 to 50 parts by weight of hollow spheres per 100 parts by weight of resin. However, in order to obtain syntactic foams of high compressive strength, there is preferably used from 20 to 50 parts by weight of microspheres per 100 parts by weight of resin; preferably, the microspheres will have a relatively thick glass wall and will be of small size (for example, a diameter from 10 to 250 micrometers).

According to an advantageous feature of this patent, there can also be used hollow spheres for compressive strength in admixture with other reinforcing fillers, for example fibers such as ceramic, aramid, steel, glass fibers, or asbestos or even carbon fibers, which have the advantage of improving the reinforcement of the foam, or reducing the shrinkage of the composition during curing and of imparting thereto improved mechanical properties, particularly a higher tensile strength and a better flexural strength.

A particularly convenient composition of lightened resins comprises, from 100 parts by weight of resin, from 20 to 50 parts by weight of hollow glass microspheres having a diameter from 10 to 300 micrometers and an apparent specific gravity of 0.1 to 0.4.

U.S. Pat. No. 4,082,702 is directed to the preparation of rigid polyurethane syntactic foams containing large amounts of microballoons. The numerous prior art references discussed in this patent teaches that compositions which contain hollow beads, bubbles or microballoons have been known for many years. The concept of using these hollow beads in a composition is designed to reduce the density and also reduce the high cost of the matrix material. It was observed, however, that a reduction in density also resulted in a reduction of the structural strength of the product and it was difficult to obtain maximum strength with a minimum density. Bozzacco et al. in U.S. Pat. No. 2,806,509 described one method for improving the strength at lower densities. Bozzacco et al. coated thin walled hollow beads with a metal power and a thermosetting resin and then heated these coated beads to tackify the resin and compressed this material to provide a laminate. Although such an approach may provide useful laminates, the procedure involved several steps and does require pressure and heating to make the laminates.

U.S. Pat. No. 3,968,996 is directed to the manufacture of a vehicle wheel utilizing an organic foam, such as polyurethane foam, as a structural load bearing member. An inner wheel disc, an outer decorative disc, and a rim interlocked with both those discs are interconnected and bonded by polyurethane foam. The polyurethane foam serves as a load bearing and load transmitting structural member; according to one method for manufacturing this wheel, the wheel rim, inner wheel disc, and outer decorative disc are positioned in a die, and a polyurethane composition is then injected into the volume defined by those wheel components for curing in situ. Alternatively, a polyurethane foam preform is adhesively bonded to the rim, inner wheel disc, and outer decorative disc in an assembly die. This vehicle wheel provides style flexibility and styling attractiveness. Furthermore, this wheel affords improved dimensional control, improved concentricity, and improved wheel balance in a vehicle wheel further characterized by low cost and light weight. Finally, since the resultant wheel is a solid wheel, noise control is insured.

According to U.S. Pat. No. 4,153,657, a vehicle wheel is manufactured using an organic resin foam, such as polyurethane foam, as a structural load bearing member. An inner wheel disc, an outer decorative disc, and a rim interlocked with both those discs are interconnected and bonded by polyurethane foam. The polyurethane foam serves as a load bearing and load transmitting structural member; according to one method for manufacturing this wheel, the wheel rim, inner wheel disc, and other decorative discs are positioned in a die, and a polyurethane composition is then injected into the volume defined by those wheel components for curing in situ. Alternatively, a polyurethane foam preform is adhesively bonded to the rim, inner wheel disc, and outer decorative disc in an assembly die.

Derleth U.S. Pat. No. 3,669,501 teaches that a polyurethane resin, catalyst and hardener composition may be sprayed into a cavity defined by the structural components of a wheel and foamed in situ. The spaced wheel shells include an ornamental plastic cover 14 and a metal disc 12 which are adhesively bonded together by the foam resin.

Hobaica et al U.S. Pat. No. 3,622,437 discloses a syntactic foam material for use as a buoyancy material. The foam structure is filled with a plurality of spheres, including microspheres 14. The foam is formed from polyester, epoxy, phenolic or other exothermically hardening resin.

SUMMARY OF THE INVENTION

In the practice of our invention high speed processing is achieved by controlling the viscosity of the syntactic foam; this foam can be poured, hand transferred, injection molded or pumped to a resin transfer mold.

The two metallic rim and disc halves and the syntactic foam core of a toughened thermoset material provide a strong, lightweight, and durable sandwich wheel structure which dampens noise and vibration transmitted from the road to the vehicle on which the wheel is used. The use of integral rim and disc halves provide wheels embodying this invention which may be accurately and economically formed, for example, as stampings and inherently balanced. In addition to sealing the seam weld, the foam core material locates and retains the bolt hole spacer ring between the disc portions, thereby further contributing to the load carrying capability of the structure and economical assembly of vehicle wheels embodying this invention.

Our invention is directed to a laminated structure, such as a vehicle wheel, said structure comprising spaced shells of thin steel, rigid plastic or a combination thereof, the space between the selected shells being filled with a syntactic foam, based on matrix materials such as Dienite TM, polyester, or epoxy foam. The foam can be poured or injected into the preformed shell cavity or said foam can be preformed and adhesively sandwiched between the shells prior to curing.

A preferred syntactic foam composition for particular use in vehicle wheel construction has as its selected components, an epoxy base resin with hardener and catalyst, rubber impact modifiers, cut fibers, and microballoons.

DESCRIPTION OF OUR PREFERRED EMBODIMENT

Figure 1:
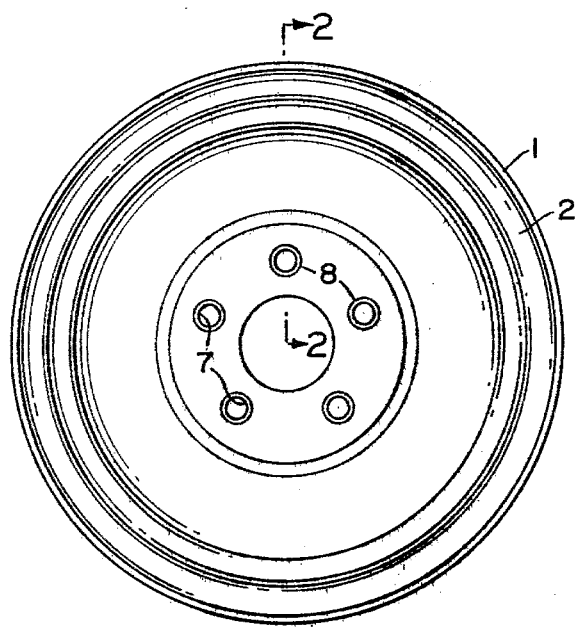
FIG. 1 is a side view of our vehicle wheel.
Figure 2:
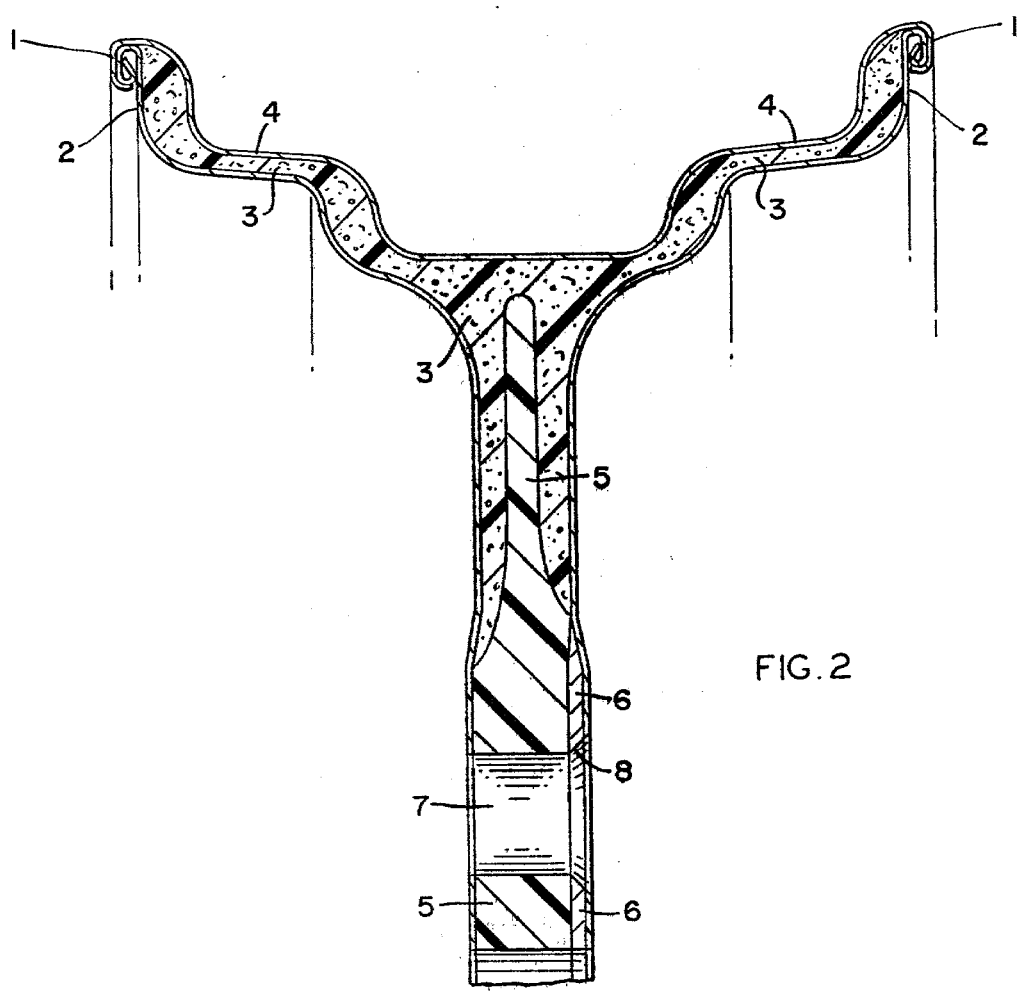
FIG. 2 is a sectional view taken on the line "2—2" of FIG. 1.

Reference should now be made to FIG. 1 and FIG. 2 of our drawing. FIG. 1 sets forth a side view of our composite wheel wherein 1 and 2 represent the bead rim with bolt holes 7, and tapered bolt hole opening 8 for tapered acorn bolts.

FIG. 2 is a sectional view taken on the line "2—2" of FIG. 1. 1 is a rolled bead rim edge; 2 is the inner and outer metal shell; 3 is the syntactic, fiber reinforced epoxy resin foam core; 4 is the metal rim; 5 is the rigid fiber reinforced polyester plastic reinforcing disc member; 6 is a metal acorn bolt hole reinforcing disc; 7 is the bolt hole and 8 is the outer opening for the tapered acorn bolt.

EXAMPLE

The following example is representative and illustrates a preferred embodiment in the practice of our invention. All parts are by weight unless otherwise specified.

EXAMPLE 1

(A) A syntactic foam composition was prepared by mixing: (1) 50 parts of the reaction product of epichlorohydrin and 2,2'-bis(p-hydroxyphenol) propane as epoxy base resin. (2) 45 parts of methyl 4-endomethylenetetrahydrophthalic anhydride and epoxy hardener. (3) 10 parts of reactive rubber impact modifier, a pre-crosslinked finely divided powder of 67% butadiene with 33% bound acrylonitrile copolymer having 80 Mooney Viscosity, a 0.98 specific gravity and a 0.5 mm particle size. (4) 12 parts glass microballoons having a specific gravity of 37 and a breaking strength of 23 at 500 psi. (5) 0.75 part of tributylamine as cure catalyst. (6) 5 parts of a blend of cut fiberglass reinforcing fibers $\frac{1}{8}$" to $\frac{1}{4}$" in length.

The above components were routinely mixed under vacuum to a uniform consistency and then transferred to a compression mold filling the cavity between the prepositioned shell and rim members and around a reinforcing disc member. A 1/16" thick metal disc was positioned contiguous to the inner bolt hold disc area of the outer shell to reinforce said shell in the area of the bolt holes. The resulting wheel composite was then cured at 250° F. for one (1) hour. The bead rim edge was then rolled and the composite wheel post cured at 300° F. for two (2) hours. The shell and rim members were of 0.03" thick steel and the reinforcing disc member was one compression molded from the sheet molding compound consisting essentially of 50% 1" cut fiberglass, 25% calcium carbonate and 25% vinyl ester resin.

The steel shell and rim members were spun, then degreased to remove lubricants and oil based rust inhibitors. These members were then sandblasted to provide a clean rough surface for adhesion.

After post curing, the rim and shell members are beaded together to provide a mechanical interlock to seal the foam core from the exterior environment and to strengthen the wheel flange.

The shell members can be stamped, hydroformed or spun. The rim is prepared by shaping the steel into a circular band and welding the ends together. The band is then shaped into the desired contour by expanding and roll forming or by spinning.

The wheel produced according, for example, to our specification disclosure has the advantage of being light in weight, of high strength, of high modulus, of acceptable cyclic load capacity, of structural integrity and increased tensile strength. This wheel is substantially non-flexible.

The recommended SAE practice and procedure to evaluate the performance of pressed steel wheels is known as the SAE J328a test (1977 SAE Handbook). The rotary fatigue test (i.e., cornering fatigue test) of this procedure, as applied to our composite wheel with tire, resulted in the following comparative data:

(A) The wheel of our example, with rated load of tire size BR78-13, performed for 241,840 cycles, a service factor of 1.6 and a rated load of tire size BR78-13.

(B) The wheel and tire of "(A)", without the 1/16" steel bolt hole reinforcing disc, performed for 43,000 cycles at the same service factor.

(C) The wheel and tire of "(A)", without the 1/16" steel bolt hole reinforcing disc, and without the rigid reinforced disc member, performed for 2,461 cycles at the same service factor.

These data clearly show the significant improvement in number of cycles achieved with our composite wheel.

The mold utilized to prepare our novel laminate wheel structure was a four part compression mold, the top and bottom plug of which supports the disc member, together with a split collar to close in and support the rim. All four sections are cored for heat control.

The mold conditions can vary, depending on selected matrix and catalyst system. The temperature can range from 250° to 320° F., the cycle time from 5 min. to 1 hour in mold followed by post cure in an oven at from room temperature to 300° F. for 30 min. to one hour.

Optionally, a thermoset injection molding system can be effectively utilized by one skilled in the art to produce our novel wheel. U.S. Pat. No. 3,960,996 illustrates such a system. This example can be varied by one skilled in the art within the context of our total specification to achieve substantially the same results with a minimum of routine experimentation.

The rigid reinforced disc member of our vehicle wheel can be made of foamed aluminum with carbon spheres. Foamed aluminum can also be utilized as the syntactic foam core.

The fiber reinforcement of our syntactic foam core can be cut fiber, glass mat and, for example, glass fabric. Conventional vinyl resins can be converted to a syntactic foam with use of predispersed microballoons.

The rim and shell members of our vehicle wheel can be formed by a spinning operation, pressed or stamped; stainless and low carbon steels are preferred. The sheet molding compound consisted essentially of 50% 1" fiberglass; 25% Ca Carbonate and 25% vinyl ester resin.

The selected syntactic foam matrix must function to maintain its load bearing capabilities during the temperature range normally encountered in vehicle wheel operation. It must be mold processable within the selected molding means such as injection molding, resin transfer molding and compression molding. The resin selected must also be bondable to the inner rim and disc-nave surfaces and to the surface of the treated fiber contiguous components of said wheel. It is preferred that the resin selected be one that is processable as a liquid. It should also be able to withstand environmental conditions normally encountered in vehicle operation, such as humidity, water, salt, gasoline and oils. If desired, a minor amount of a chemical blowing agent can be used together with the selected microballoon component. It is understood that proper control of the viscosity must be maintained to insure mold processability.

A typical epoxy resin that can be utilized is known as EPON 828, Shell Chemical Company, and has the following chemical structure:

This is a low molecular weight resin having extremely low shrinkage.

The syntactic foam matrix utilized in the preparation of our novel vehicle wheel structure is a thermosetting resin that has been fiber reinforced and contains microballoons; this foam meets the heat property requirements encountered in use.

The selected reinforcing fiber can be, for example, glass fiber, carbon fiber, metal fiber or aramid fiber. This fiber functions to impart high modulus and high tensile strength to the selected syntactic foam matrix. The fiber should be one that is wettable with the matrix, or, for example, wettable after pretreatment such as the pretreatment of glass fibers with a silane material; this insures high bond strength. The fiber length to diameter ratio should be over 100 (aspect ratio) to insure acceptable load transfer capability; it is, of course, essential to maintain processing capability for a given matrix composition.

The particular fiber selected by one skilled in the art can be one of those heretofore specified or other fiber materials found to be functionally equivalent.

The microballoon component functions to reduce weight and to achieve higher compressive strength. The microballoons of smaller diameter inhibits crack growth along with imparting higher impact resistance. Compressive strength is increased with an increase in the wall thickness of the microballoons. The use of a random microballoon size is preferred and the selected microballoons must be subjected, for example, to a surface treatment with a silane, or, for example, an organo titanate, to insure bonding to the matrix. The selected microballoon can be glass, silicate, epoxy or phenolic, or, others known in the art; selection depending on wheel requirements.

The preparation and characterization of various syntactic foams which can be selectively used in the practice of the present invention, is found in, for example, Modern Plastics Encyclopedia 1977-1978, pages 142 and 143; The Journal of Materials Science 1977, Vol. 12, page 2157; Modern Plastics Encyclopedia 1975-1976, page 119 and Modern Plastics Encyclopedia 1978-1979, page 145.

The selected microspheres or microballoons for the synthetic foam utilized in the practice of the present invention depending on wheel performance desired. The preformed hollow spheres can be added into a liquid resin matrix followed by chemically setting the mix to a fairly rigid state. Syntactic foam differs from gas-blown foam since no blowing agent is needed.

The spheres are made from a wide variety of materials including silicate, epoxy, phenolic, glass, and Saran. Hollow spheres presently being offered commercially include Q-Cel from Philadelphia, Quartz Co., Glass Bubbles from 3M Co., Microballoons from Emerson & Cuming, and Phenolic Microballoons from Union Carbide. Hollow particles can also be made by expanding naturally occurring materials such as perlite and coal dust.

The particle size and particle density of hollow spheres vary greatly. Some are classified as micro-

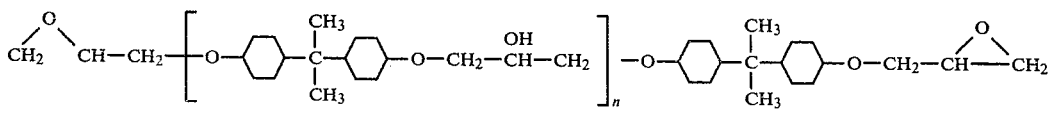

spheres, and range in particle size from 20 to more than 200 micrometers in diameter. The particle density varies with material type and particle size of the hollow sphere, but is usually between 0.15 and 0.7 g./cc (9.3 to 44 lb./cu.ft.).

The resin matrices for syntactic foams can vary, but polyester and epoxy resins are used for the majority of applications. Densities of syntactic foams range from 0.4 g./cc. (25 lb./cu.ft.) to nearly the density of the resin itself, depending on the quantity of hollow spheres added, and the density of the spheres.

In the practice of the present invention the selection of the thermosetting resin is based on performance requirements.

I claim:

1. A light weight vehicle wheel having preformed rigid rim and disc-nave inner and outer shell members joined at the bead rim and separated by and internally bonded to (1) a load bearing fiber reinforced syntactic foam and (2) a rigid reinforced disc member positioned between and contiguous to the internal nave portion of said inner shell and a metal bolt hole reinforcing disc member positioned internally and contiguous and bonded to said disc member and to the internal nave portion of said outer shell, said disc member tapering circumferentially and uniformally into the body of said syntactic foam to a point close to the center of the internal rim portion of said wheel.

2. A light weight wheel according to claim 1 wherein said rim and said disc-nave inner and outer shell members are made of a rigid metal.

3. A light weight wheel according to claim 1 where said rim and said disc-nave inner and outer shell members are made of steel.

4. A light weight wheel according to claim 1 wherein said rim and said disc-nave inner and outer shell members are made of a molded rigid fiber reinforced plastic.

5. A light weight wheel according to claim 1 wherein said foam is an epoxy foam containing glass microballoons and the rigid reinforced disc member is a high fiber reinforced plastic molding compound.

6. A lightweight wheel according to claim 1 wherein said cut fibers are from about ⅛" to about 1" in length and present in an amount of from about 1% to about 30% by weight.

7. A lightweight wheel according to claim 1 wherein said cut fibers are from about ⅛" to about 1" in length and present in an amount of from about 15% to about 25% by weight.

8. A lightweight wheel according to claim 1 wherein said cut fibers are from about ⅛" to about ¼" in length and present in an amount of from about 1% to about 30% by weight.

9. A lightweight wheel according to claim 1 wherein the microballoons of said syntactic foam are glass and from 1 to 500 micrometers in diameter.

10. A lightweight wheel according to claim 1 wherein the microballoons of said syntactic foam are glass and from 10 to 250 micrometers in diameter.

11. A lightweight wheel according to claim 1 wherein the microballoons of said syntactic foam are present in an amount of from about 5% to about 25% by weight of said foam.

12. A lightweight wheel according to claim 1 wherein the microballoons of said syntactic foam are present in an amount of about 15% by weight of said foam.

* * * * *